United States Patent [19]

Wallenstein

[11] 4,152,610

[45] May 1, 1979

[54] TURBOGENERATOR HAVING DUAL COOLING

[75] Inventor: Mihály Wallenstein, Budapest, Hungary

[73] Assignee: Patentbureau DANUBIA, Budapest, Hungary

[21] Appl. No.: 778,243

[22] Filed: Mar. 16, 1977

Related U.S. Application Data

[63] Continuation of Ser. No. 622,270, Oct. 14, 1975, abandoned, which is a continuation of Ser. No. 496,931, Aug. 13, 1974, abandoned.

[30] Foreign Application Priority Data

Aug. 22, 1973 [HU] Hungary .............................. WA 284

[51] Int. Cl.² ............................................ H02K 9/00
[52] U.S. Cl. ....................................... 310/59; 310/61; 310/214; 310/215
[58] Field of Search ........................ 310/52, 45, 59, 61, 310/64, 65, 214, 215, 217, 218, 262, 261, 162–164, 264, 265, 194

[56] References Cited

U.S. PATENT DOCUMENTS

| | | | |
|---|---|---|---|
| 2,483,066 | 9/1949 | Sigmund | 310/215 |
| 2,661,434 | 12/1953 | Kilbourne | 310/64 |
| 2,664,512 | 12/1953 | Huntley | 310/64 |
| 2,702,870 | 2/1955 | Norris | 310/61 |
| 2,819,514 | 1/1958 | Polard | 310/215 |
| 3,679,925 | 7/1972 | Fort | 310/45 |
| 3,781,581 | 12/1973 | Lehuen | 310/214 |

Primary Examiner—R. Skudy
Attorney, Agent, or Firm—Ernest F. Marmorek

[57] ABSTRACT

A high-power, high-speed synchronous rotary electric machine having an airgap defined therein, includes a cylindrical rotor havng a shaft, slots defined in the rotor for receiving a rotor winding, subslots defined in the rotor in communication with the slots, a plurality of cooling channels defined in the slots in connection with the rotor winding and adjacently disposed along cylindrical surfaces coaxial with the shaft, first connecting means operative to interconnect adjacent channels to be in communication with each other, a second connecting means operative to interconnect the subslot to the channel disposed closest to the shaft, an inlet port defined in the rotor in communication with the channel disposed farthest from the shaft, and an outlet port defined in the rotor in communication with the airgap and disposed in an axial direction with respect to each other.

4 Claims, 4 Drawing Figures

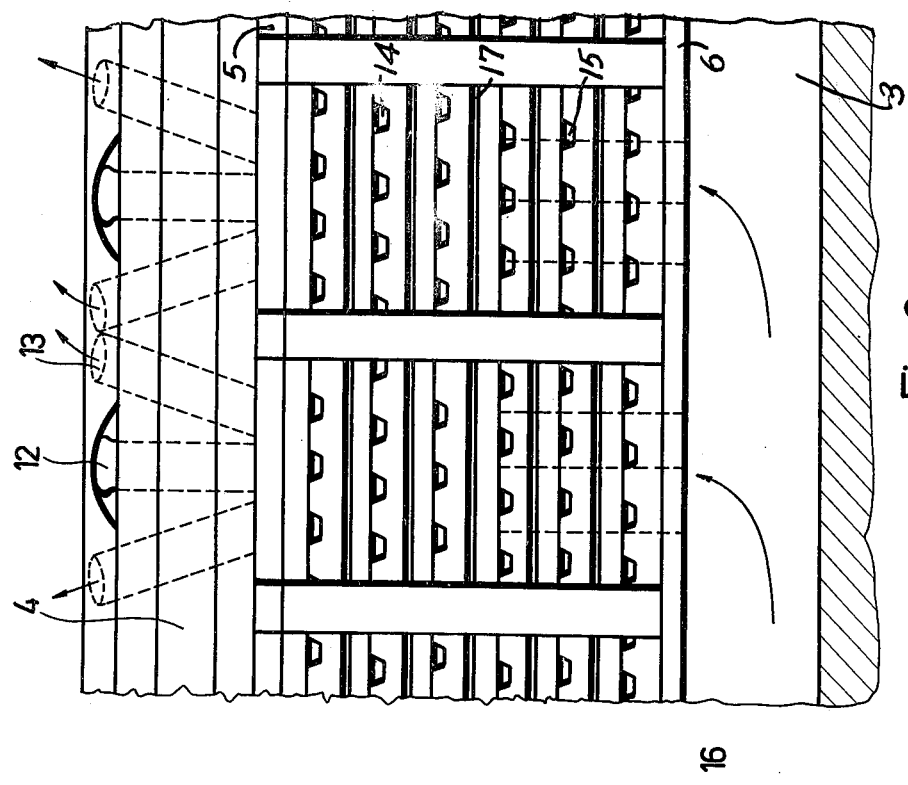
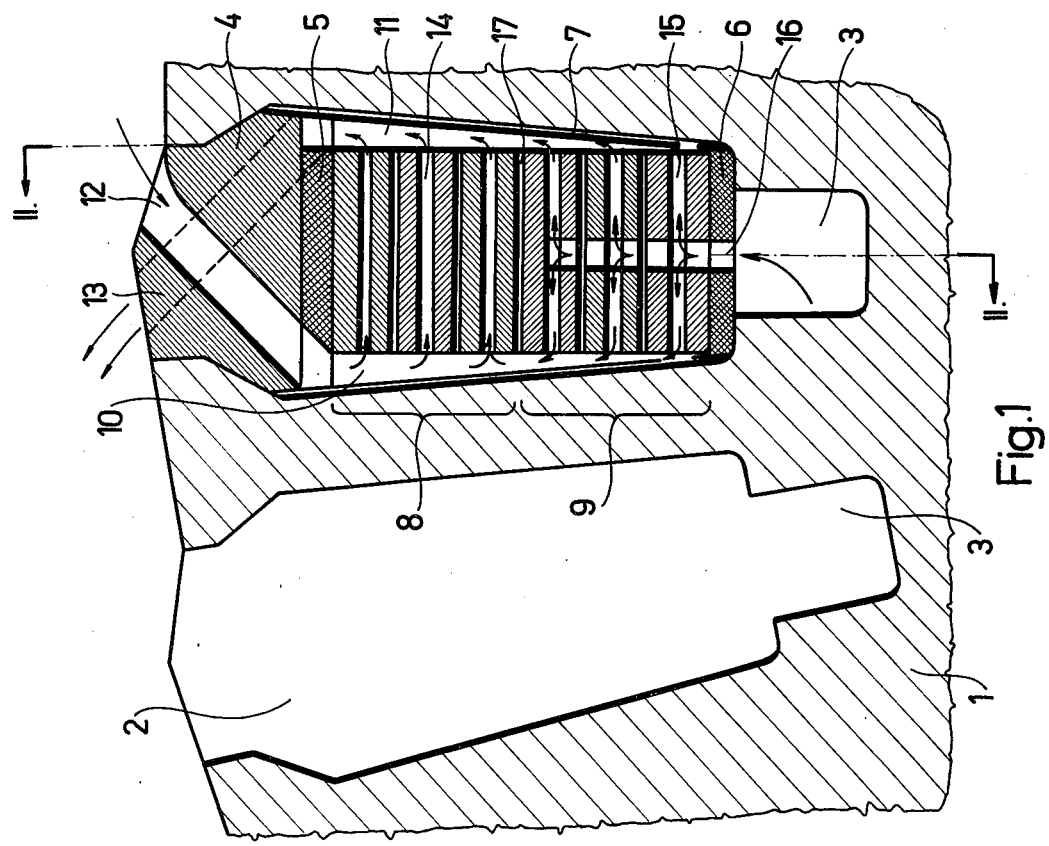

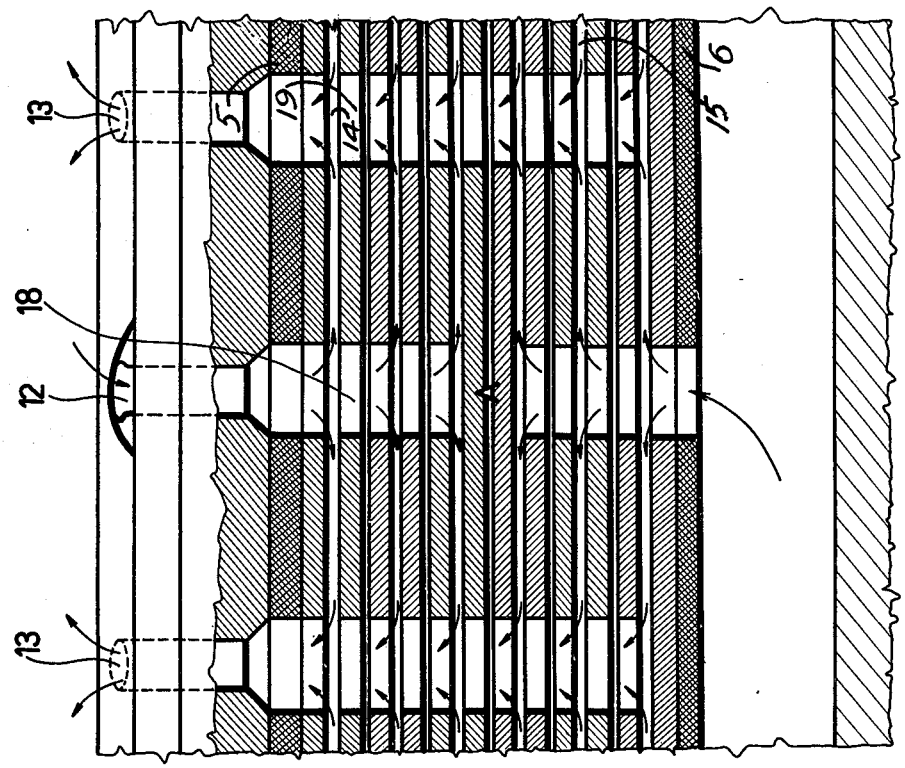
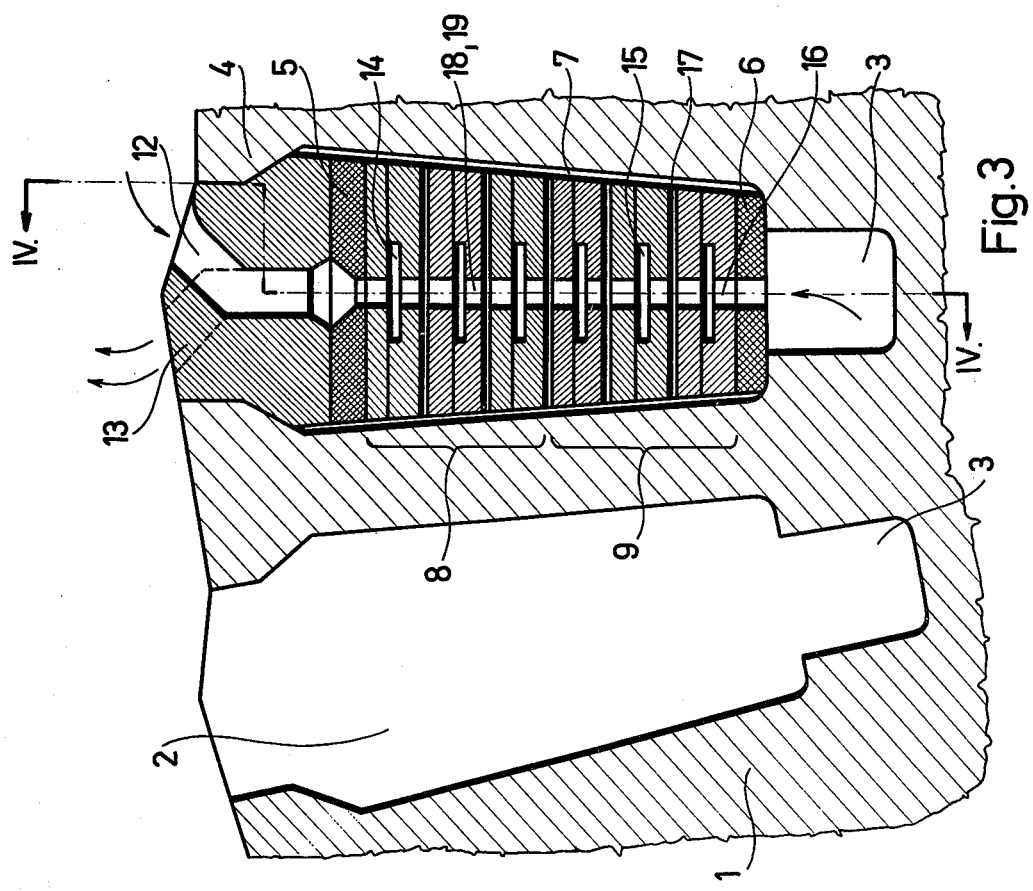

TURBOGENERATOR HAVING DUAL COOLING

This is a continuation of application Ser. No. 622,270, filed Oct. 14, 1975, now abandoned which was a continuation of Ser. No. 496,931 filed Aug. 13, 1974 now abandoned.

The invention relates to a rotary electric machine especially to a high-power and high-speed synchronous machine provided with cylindrical rotor.

The direct cooling of the rotor winding supplied with direct current of the rotary electric machines of very high power (several-hundred megawatts) and high speed, especially the two-pole synchronous machines provided with cylindrical rotor (turbogenerators) is ensured by gas cooling or liquid cooling.

With higher powers, the gas cooling is generally realized by the use of hydrogen. The advantages of hydrogen (low specific weight, low gas frictional loss, relatively high specific heat, good electric insulating capacity, etc.) are well known.

The designers striving after the development of machines of even higher unit power can have the choice of two basic types of the direct conductor cooling, i.e. of the liquid cooling and the gas cooling. The choice is not at all simple. For the gas cooling it is to be said that this solution has traditions of several decades both with the manufacturers and the consumers, it is, however, doubtful whether the intensity of gas cooling can be increased to such an extent as required by the increasing demands. For the other alternative it is to be said that the liquid has a very high specific heat and thermal conductivity, in order to enforce these advantages, however, numerous new structural, engineering and operational safety problems shall be solved (increasing the number of parallel liquid paths, sealing of the cooling system etc.) and the risk involved in the unsolvedness of these problems shall be taken, respectively.

Nowadays when the increase from 500–1000 MW to 1000–2000 MW of the unit power of two-pole turbogenerators is aimed at, the question again arises whether the relative cooling technical tasks can be performed by further developing the classical hydrogen cooling or the change-over to the liquid cooling and the assumption of the accompanying risks are inevitable.

When examining this question, it should be briefly mentioned that the most intensive forms of the hydrogen cooling used in the rotors of large turbogenerators can be also divided into two groups. The division is based on that where the gas, cooling the most part of the winding, the part laying in the iron body, enters the rotor. The cooling gas discharges namely in case of both groups in the same manner, radially, on the mantle surface of the rotor in the direction corresponding to the centrifugal force.

With the first group, the cooling gas enters the rotor axially on the endfaces of the rotor, then it flows axially either in the channels developed in the conductors themselves or in the iron body of the rotor in the subslots developed beneath the coil slots, then it turns in radial direction and leaves the rotor on contacting the coils. In this case, the axial direction is characteristic to the flow of the cooling gas, therefore these systems will be called further on "axial" systems.

With the second group, in case of rotors of so-called "gap pick up" system, the cooling gas enters the rotor on the mantle surface and flows inwards in radial direction, then flowing in axial or tangential direction, or having such direction-components it contacts the conductors to be cooled, finally turning again in radial direction it leaves the rotor. With the system, being called further on "gap pick up" system, the radial flow is characteristic.

The usefullness of hydrogen-cooled rotors depends to a significant extent on the gas quantity to be introduced into the rotor in unit time. In case of large gas quantity the warming-up of the gas is namely lower at a given loss ($I^2R$) and the heat drop on the cooled surfaces of conductors is lower, respectively, thus after all the overheating of the coil as compared to the temperature of the cold cooling gas is lower. Finally, this is the pivotal question of the development of very-high-power machines.

The gas quantity to be carried in into the rotor is—as experience shows—approximately proportional to $D^2$ in case of "axial" system and (D.L.) in case of "gap Pick up" system (D—diameter of the rotor, L—active iron length). Consequently, the rotor of "axial" system shall be made with a short iron body and with a diameter as large as possible, whereas in case of a "gap pick up" system, the gas quantity to be introduced increases proportional to the iron length. While thus the length of the rotor of axial flow is limited (the flow losses increase together with the increase of the length of flow channel, the intake cross-section on the front side is relatively small), with the "gap pick up" system the relatively small cross-section of the inlet and outlet ports developed generally in the coil fastening keys, on the mantel surface of the rotor limits the quantity of cooling gas to be passed through the rotor.

After all, the utilizability of the rotor is limited with the known solution of "axial" system and of "gap pick up" system, since also the gas quantity to be introduced is limited. With the known methods, the maximum unit capacity to be achieved at the two-pole turbogenerator amounts to about 1000–1200 MW at the largest rotor diameter admissible with respect to the strength (about 1250 mm).

With the "axial" system—as already mentioned—the length of the iron body is limited, since an advantageous "axial" cooling can be achieved with proportions of at most $L=3\sim4$ D. The diameter of the rotor, however, cannot be increased beyond a certain limit for strength reasons, therefore the gas quantity to be introduced can be increased only when increasing the length of the iron body. The length of the iron body of the machine of required very high power should be at least $L=6\sim8D$, a rotor of such a length, however, cannot be efficiently cooled with an "axial" cooling system.

The basis of the "gap pick up" system consists in that between the inlet and outlet ports developed on the mantle surface of the rotor a constant differential pressure occurs as a result of the rotation (dynamic pressure and suction), rendering possible the introduction of the cooling gas into the rotor. Since the centrifugal force produces theoretically the same effect both in the inlet and in the outlet channels, these two effects should compensate each other according to the principle of continuity. In the practice, however, the gas entering the rotor is considerably colder consequently of higher density than the gas discharging from the rotor. Thus, a greater centrifugal force is operative on the gas in the inlet channel than in the outlet channel. This phenomenon impairs the intensity of cooling and to the greater extent, the greater the difference between the temperature of the inlet gas and that of the outlet gas and the deeper the coil slot is.

As it is to be seen, a proper cooling can be achieved with the known "axial" and "gap pick up" systems only in case of machines of specified dimension (power), with the former system the length of the slot (iron body), with the latter one the depth of the slot is limited.

The aim of the invention is the development of a gas cooling system for electric rotary machines, especially for high-power and high-speed synchronous machines provided with cylindrical rotor, by means of which machines of larger dimensions (power) than those used up to now can be effectively cooled and which renders unnecessary the change-over to the liquid cooling with machines of 1000–2000 MW power.

The set aim can be achieved according to the invention by that the "axial" and the "gap pick up" cooling systems are combined. The combination results in an electric rotary machine, especialy in high-power and high-speed synchronous machine provided with cylindrical rotor, in the rotor of which coil slots receiving the rotor winding, beneath the coil slots subslots are developed, while in the conductors of the rotor winding or between them cooling channels arranged along cylindrical surfaces coaxial to the shaft of the rotor are formed, the adjacent cooling channels are connected to each other and the cooling channel being nearest to the shaft is connected to the subslot, whereas the cooling channel being farthest from the shaft is connected to inlet and outlet ports leading to the airgap of the electric rotary machine, shifted in axial direction from each other.

In an advantageous embodiment, the cooling channels are tangential. In this case it is advantageous if the cooling channel being nearest to the shaft is connected to the subslot through channels of radial direction arranged in the centreline of the coil slot, whereas the cooling channel being farthest from the shaft is connected to the inlet and outlet ports through channels of radial direction arranged along the side walls of the coil slot. In case of the latter form, it is expedient if the channels of radial direction arranged along the side walls of the coil slot reach from the cooling channel being farthest from the shaft to the cooling channel being nearest to the shaft and the cahnnels of radial direction connected with the subslot reach at least to the cooling channel being the second nearest to the shaft.

With another advantageous embodiment, the cooling channels are axial. In this case it is advantageous if the cooling channel being nearest to the shaft is connected to the subslot, and the cooling channel being farthest from the shaft to the inlet and outlet ports through channels of radial direction arranged in the centreline of the coil slot. In this latter case, it is expedient if of the radial channels connected to the cooling channel being nearest to the shaft only those being in line with the radial channels connected to the inlet ports are connected with the subslot. With this embodiment it is expedient if the radial channels connected to the outlet ports reach to the cooling channel being nearest to the shaft, or if the channels of radial direction connected with the subslot extend at least to the cooling channel being the second nearest to the shaft and all other cooling channels are connected to the radial channels connected to the inlet ports. In certain cases such an embodiment may be advantageous, in which the radial channels connected to the inlet ports are directly connected to the channels of radial direction being in line with them and connected to the subslot.

Further it is expedient if the inlet ports are slanted in the rotation sense of the rotor, whereas the outlet ports in opposite sense, as compared to the radial direction.

The main advantage of the solution according to the invention consists in that the cooling of "gap pick up" system of the conductors being farther from the shaft is effected at a relatively low counterpressure and the gas quantity necessary for the cooling according to the "axial" system of the conductors being nearer to the shaft can be introduced without difficulty on the front side of the rotor.

The invention will be now described with reference to the exemplarified embodiments shown in the enclosed drawings, where FIG. 1 is the section taken in a plane vertical to the shaft, of the rotor of a synchronous machine provided with cylindrical rotor, using cooling channels of tangential direction, FIG. 2 shows the gradual section II—II of the rotor according to FIG. 1, FIG. 3 is the section taken in a plane vertical to the shaft, of the rotor of a synchronous machine provided with cylindrical rotor, using cooling channels of axial direction, FIG. 4 shows the gradual section IV—IV of the rotor according to FIG. 3.

In case of the embodiment according to FIGS. 1 and 2, coil slots 2 are developed in the iron body 1 of the rotor of the synchronous machine provided with cylindrical rotor. Beneath the coil slots 2 and subslots 3 connected therewith are provided for, running in axial direction through the rotor and being open towards the front sides thereof. In the coil slots 2 winding consisting of outer 8 and inner 9 conductors is arranged. The conductors 8, 9 are arranged in the coil slots 2 parallel to each other in axial direction. One pair of conductors each constitutes one turn each. The turns are separated from each other by means of interturn insulations 17. At the bottom and top of the coil slots 2 insulations 5 and 6, along their side walls an insulation each 7 are arranged. In the insulations 7 channels 10, 11 of radial direction are developed which are in communicating connection with the tangential cooling channels 14, 15 developed in the conductors 8, 9. Through the inner conductors 9, in the symmetry plane of the coil slot 2, inlet channels 16 (marked with dashed line in FIG. 2) are provided interconnecting the subslot 3 with the cooling channels 15. The mouth of the coil slot 2 is closed by a key 4 in which inlet 12 ports and outlet ports 13 are provided for. The ports 12, 13 are inclined as compared to the radial direction, in such a manner that the inlet ports 12 are slanted in the rotation sense, whereas the outlet ports 13 opposite to the rotation sense.

The flow direction of cooling gas is indicated by arrows in FIGS. 1 and 2. Accordingly, the cooling gas enters the coil slot 2 through the subslot 3 and the inlet ports 12. From the inlet ports 12 the cooling gas flows into the channels 10 along one wall of the coil slot then into the tangential cooling channels 14, thereafter into the channel 11 along the other wall of the coil slot and finally flows out from the rotor through the outlet ports 13 into the airgap of the synchronous machine. From the subslot 3 the cooling gas flows through the inlet channels 16 into the tangential cooling channels 15, therefrom directly, and through the channels 10 along one side wall of the coil slot as well as through the tangential cooling channels 14, respectively into the channels 11 along the other wall of the coil slot, finally through the outlet ports 13 into the airgap of the synchronous machine.

It is to be seen from those said above, that the cooling of the outer conductors 8 is performed according to the "gap pick up" system, that of the inner conductors 9 according to the "axial" system.

In case of an embodiment according to FIGS. 1 and 2, a special advantage is ensured by that the cross-section of the channels 10, 11 of radial direction—the coil slot 2 being trapezoidal—increases to the same extent as the gas quantity passing it.

In case of the embodiment according to FIGS. 3 and 4, no cooling channel is made along the side walls of the coil slot 2 and the cooling channels 14, 15 between the conductors 8, 9 are not of tangential but of axial direction. The cooling channels 14, 15 run axially through the conductors 8, 9. The interconnection between the subslot 3 and the inner conductors 9 is ensured by inlet channels 16, like with the former example, of which, however, only every second one lead directly into the subslot 3, the others reach only up to the innermost cooling channel 15 and are connected through that with the subslot 3. The connection between the cooling channels 14 of the outer conductors 8 and the airgap of the synchronous machine, respectively, the inlet 12 and outlet 13 ports is ensured by channels 18, 19 developed similarly to the channels 16 and laying in line therewith. They are alternately connected with the ports 12 and 13, namely in such a manner that the channel 19 connected to the port 13 is also directly connected to the channel 16 developed in line therewith, while the channel 18 connected to the port 12 is separated from the channel 16 laying in line therewith at the point "A".

The flow direction of the cooling gas is indicated by arrows also in FIGS. 3 and 4. The cooling gas flows from the subslot 3 into the channels 16 open at the bottom then through the cooling channels 15 towards the adjacent radial channels 16. These latters are interconnected with the channels 19, through which the cooling gas flows into the outlet ports 13 and therefrom into the airgap. The cooling gas entering through the inlet ports 12 flows into the channels 18, then—through the cooling channels 14—into the adjacent channels 19 and therefrom, through the outlet ports 13 again into the airgap. The cooling of the outer conductors 8 takes place according to the "gap pick up" system, that of the inner conductors 9 according to the "axial" system. Since the channels 16 and 18 are separated from each other, the cooling system of the outer conductors 8 and that of the inner conductors 9 are practically fully independent of each other and the cooling gases flowing in the two systems are mixed with each other only at the discharge.

The structural separation of the two systems is not absolutely necessary. If in point "A" a breakthrough is made, the separation develops in a natural manner but the dividing line of the two systems shall be not by all means at the middle conductor but—depending on the prevailing pressure ratio—above or beneath it.

The above described two embodiments are only examples aiming at the better understanding of the invention. According to those said above several further embodiments may be produced without deviating from the inventive idea.

The essence of the invention is the common use (combination) of the "gap pick up" and "axial" systems, becoming possible thereby that the cooling channels 14, 15 run along the potential surfaces (concentric cylinders) of the centrifugal field developing during the rotation of the rotor.

How many of the conductors laying in the slot are connected in the "gap pick up" cooling system and how many in the "axial" cooling system, depend always on the given special conditions. If a half-and-half ratio is taken, it is obvious that the cooling of "gap pick up" system will be considerably more intensive as compared to the case when all conductors would be cooled in the "gap pick up" system, since the available cooling gas quantity is practically constant, the heat to be taken away reduces to the half. Accordingly, the warming up of the cooling gas and the density difference of the inlet and outlet cooling gas are also reduced to the half. Due to the reduction to the half of the density difference as well as of the thickness of layer to be cooled the counterpressure impeding the flow of cooling gas is reduced as well.

If the "axial" cooling is applied only on the lower $\frac{1}{3}-\frac{1}{4}$ part of the complete coil height, the gas quantity flowing from the part of "axial" system to the common output channel will be even in this case advantageous, reducing also the above mentioned density difference. Moreover, with the embodiment according to FIGS. 1 and 2 a less quantity of hot cooling gas flows from the part of "axial" system into the inlet channel of the part of "gap pick up" system, than in the case when the complete coil slot is coded according to the "gap pick up" system.

The combined cooling system according to the invention—the cooling gas being hydrogen—allows a current density of 15–20 A/sq.mm at an overpressure of about 5 atm in the coil turns, thus with its use, turbogenerators of unit capacity even above 1000 MW can be produced.

What I claim is:
1. In a high power, high-speed rotary synchronous electric machine having an airgap in combination:
   a rotor including a metal body of predetermined length and rotatable about an axis;
   a plurality of slots of predetermined width defined in the body of said rotor, each slot extending substantially along the length of said body, two sidewalls defining the width of each of said slots,
   a plurality of subslots defined in the body of said rotor, each of said subslots having a width smaller than that of said slots, each subslot being associated with a respective one of said slots and being arranged as a substantially symmetrical and radially inward extension of the associated slot and communicating with a part of said slot facing the axis along the length of said body;
   said subslots terminating at opposite end faces of said rotor and being open at said end faces;
   a rotor winding consisting of a plurality of parts, each of said parts including a plurality of winding turns, being arranged in a respective one of said slots, and being spaced from two sidewalls of the corresponding slots, so as to define first and second radial channels between the respective sidewalls and the winding part, each part having a predetermined length;

a plurality of wedges in said rotor for closing said slots, respectively, and for supporting respective of said winding parts against centrifugal forces, said wedges defining a plurality of groups of inlet and outlet ports for each of said slots, each port communicating with said airgap, said inlet and outlet ports in each of said groups being oppositely inclined relative to the direction of rotation of the rotor, and being axially offset relative to each other, each inlet port in a slot communicating with the first, and each outlet port with the second of said radial channels, said groups being substantially periodically arranged along the length of said body;

each of said rotor winding parts being disposed in a slot associated therewith and defining a plurality of cooling channels arranged tangentially relative to said axis, each cooling channel communicating with the first and second radial channels in the slot, said cooling channels being arranged at respective different radial levels corresponding to the respective winding turns, substantially periodically along the full length of a respective winding part;

first insulating means located between adjacent turns of said winding parts in each of said slots; and second insulating means located in each of said slots between a radially inwardly facing portion of the radially innermost winding part and a radially inwardly facing portion of the slot, said second insulating means at least partly closing the communication between a respective one of the subslots and the associated slot;

in each slot an inner region of one of said winding parts and said first and second insulating means defining a plurality of radial connecting channels, each communicating with said subslot and at least some of the cooling channels in said inner region, said radial connecting channels being arranged substantially periodically along the length of one of the winding parts.

2. The electric machine as claimed in claim 1, wherein said slots have a substantially trapezoidal cross section across the length thereof, so that said first and second radial cooling channels narrow in a radially inward direction.

3. The electric machine as claimed in claim 2, wherein each of said slots extends in a predetermined direction, and said cooling channels extend in a direction at an angle relative to the direction of the slots.

4. The electric machine as claimed in claim 3, wherein each of said winding parts has a center axis, and wherein each of said radial connecting channels is substantially coaxial with said center axis.

* * * * *